US006628605B1

(12) United States Patent
Chang (10) Patent No.: US 6,628,605 B1
(45) Date of Patent: Sep. 30, 2003

(54) METHOD AND APPARATUS FOR EFFICIENTLY TRANSMITTING MULTIPLE DATA SIGNALS

(75) Inventor: Charles E. Chang, Newbury Park, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/358,198

(22) Filed: Jul. 21, 1999

(51) Int. Cl.[7] ................................................ H04J 11/00
(52) U.S. Cl. ........................ 370/208; 370/343; 375/356
(58) Field of Search ................................ 370/263, 282, 370/441, 442, 259, 266, 267–269, 276, 280, 281, 310, 310.2, 319, 320, 329–335, 464, 465, 431; 375/295, 298, 299, 257, 306, 307, 316, 344–347, 349, 354–356

(56) References Cited

U.S. PATENT DOCUMENTS

| | | | | | |
|---|---|---|---|---|---|
| 4,866,704 | A | * | 9/1989 | Bergmann | 370/85.4 |
| 5,745,485 | A | * | 4/1998 | Abramson | 370/342 |
| 5,757,767 | A | * | 5/1998 | Zehavi | 370/208 |
| 5,930,230 | A | * | 7/1999 | Odenwalder et al. | 370/208 |
| 6,081,697 | A | * | 6/2000 | Haartsen | 455/109 |
| 6,181,674 | B1 | * | 1/2001 | Xin et al. | 370/203 |
| 6,275,484 | B1 | * | 8/2001 | Lynch et al. | 370/342 |

OTHER PUBLICATIONS

"The CDMA Revolution", http://www.cdg.org/a_ross/CDMARevolution.html.
CDMA Digital Technology, Qualcomm, "How Does CDMA Work?", http://www.omnitracs.com/cdma/phones/whatis-cdma/mult.html.
CDMA, http://webopedia.internet.com/TERM/C/CDMA.html.
Gregory Wornell, "Efficient Symbol–Spreading Strategies for Wireless Communication", MIT Research Laboratory of Electronics No. 587, Oct. 1994, http://allegro.mit.edu/dspg/publications/TechRep/199410Wornell.html.
George A. Betzos, et al., "Evaluation of Array Codes for Large Data Pages", Optoelectronic Computing Systems Center and Department of Electrical Engineering, Colorado State University, Fort Collins, CO, http://www.lance.colostate.edu/opt...Library/Conference/depom96/george/.
Rockwell Science Center, "DARPA ITO Sponsored Research" "1997 Project Summary", http://www.darpa.mil/ito/sSummaries97/B434_0.html.
Professor M.B. Pursley, Advisor; "Wireless Communiation Systems", Topic #5: New Cellular Telephone Systems, Clemson University ECE Dept., http://www.eng.clemson.edu/crb/sure/wireless.htm.
Steven Hersey and Stan Lumish, "WANTED: More Fiber Capacity", http://www.lucent.com/netsys/dwdm.html.

(List continued on next page.)

*Primary Examiner*—Ajit Patel
*Assistant Examiner*—Raj Jain
(74) *Attorney, Agent, or Firm*—Keith Kind; Kelly H. Hale (57) ABSTRACT

A switch suitable for use in high-bandwidth environments is disclosed. The switch eliminates the need for inter-stage jitter compensation by determining the timing signals associated with each data input and then re-timing the data based upon the timing signals at the switch output. Bandwidth is conserved by routing timing signals through a multiplexer that preferably determines the difference between the timing signal and a reference signal, combines the difference signal with other difference signals calculated for other data inputs, and then transmits the multiplexed difference signals to a demultiplexer. Suitable multiplexing schemes include time division multiplexing, wavelength division multiplexing, code division multiple access (CDMA) multiplexing, as well as various combinations of suitable multiplexing methods.

15 Claims, 9 Drawing Sheets

OTHER PUBLICATIONS

"Sonet Glossary", http://www.sonet.com/docs/gloss.htm.

Nortel Northern Telecom, "An Introduction to Synchronous Optical Networks", http://www.nt.com/broadband/reference/sonet_101.html.

Edward Spivak, "Why Digital NetworksAre Better With GPS Synchronizing", http://www.absolutetime.com/edspiv–1.htm.

Keh–Chung Wang, "High Speed Circuits for Lightwave Communications", Autumn 1998, http://www.wspc.com.sg/books/engineering/3849.html.

Rockwell, "WDM with Electronic Switching Technology", http://www.risc.rockwell.com/west/index_body.html.

* cited by examiner

METHOD AND APPARATUS FOR EFFICIENTLY TRANSMITTING MULTIPLE DATA SIGNALS

FIELD OF THE INVENTION

The present invention relates generally to data communications, and more particularly to methods and apparatus for modulating signals for transmission on a limited number of data media. Various aspects of the invention relate to modulation schemes that are particularly well suited for transmitting timing information that is associated with digital data.

BACKGROUND OF THE INVENTION

High-speed digital networks are commonly used to transmit voice, data, facsimile and other information. Such networks have many uses, especially in the fields of telecommunications and supercomputing. In response to demand for high speed communications architectures, fiber optic networks and other high-bandwidth technologies have been developed. Fiber optic networks typically represent data bits as pulses of light traveling along long strands of optical fiber. Similarly, electrical networks represent data bits as electrical signals on an electrical transmission line. The pulses of light or electricity are typically grouped together into packets that can be quickly switched and relayed through complicated network systems. Other media for transmitting digital data include, for example, copper wires, microwaves, coaxial cables and radio signals.

In North America, a basic telecommunications protocol for digital communications over fiber optic networks is the synchronous optical network, or SONET. In Europe and Asia, a similar protocol known as the synchronous digital hierarchy (SDH) protocol is more prevalent. Both SONET and SDH define standards that are commonly known so that products manufactured by various companies can communicate with each other. American National Standards Institute, Inc., for example, publishes a SONET standard that specifies optical interface rates, message format specifications and the like. A common SONET standard (OC-192) generally specifies a common clock rate of about 10 GHz, with an acceptable tolerance of +/−20 ppm. The tolerance is necessary because clock signals are generated by many different sources in SONET networks, so some variation is generally unavoidable. SONET also defines blocks of optical communication called "optical channels" (OCs). A basic optical channel (OC-1) bit rate is 51.84 Mbps (million bits per second), and each OC can be subdivided into sub-channels. Higher bit rates are frequently defined as multiples of the OC-1 bit rate. For example, a 10 Gbps (10,000,000,000 bits per second) channel could transmit as many as 192 OC-1 channels. With WDM (wavelength division multiplexing), several (4-80) OC-192 channels can be transmitted on a single fiber. One OC-192 fiber can generally transmit up to 150,000 simultaneous phone conversations. In general, the frequency of the clock signal is two times that of the "10101010" bit pattern with NRZ (Non-Return to Zero) data.

Typically, communications networks such as those based on the SONET standard include switching systems that are used to configure the network based upon command or network failure. Because SONET and SDH networks carry high volumes of traffic, relatively large switch fabrics are typically required. For example, common digital switches utilized (referred to as 128×128 switches) are capable of routing a signal received on any of 128 inputs to any of 128 outputs. Other preferred switch fabrics commonly used in high speed switches include 256×256 switches and 512×512 switches, among others.

Figure 1:
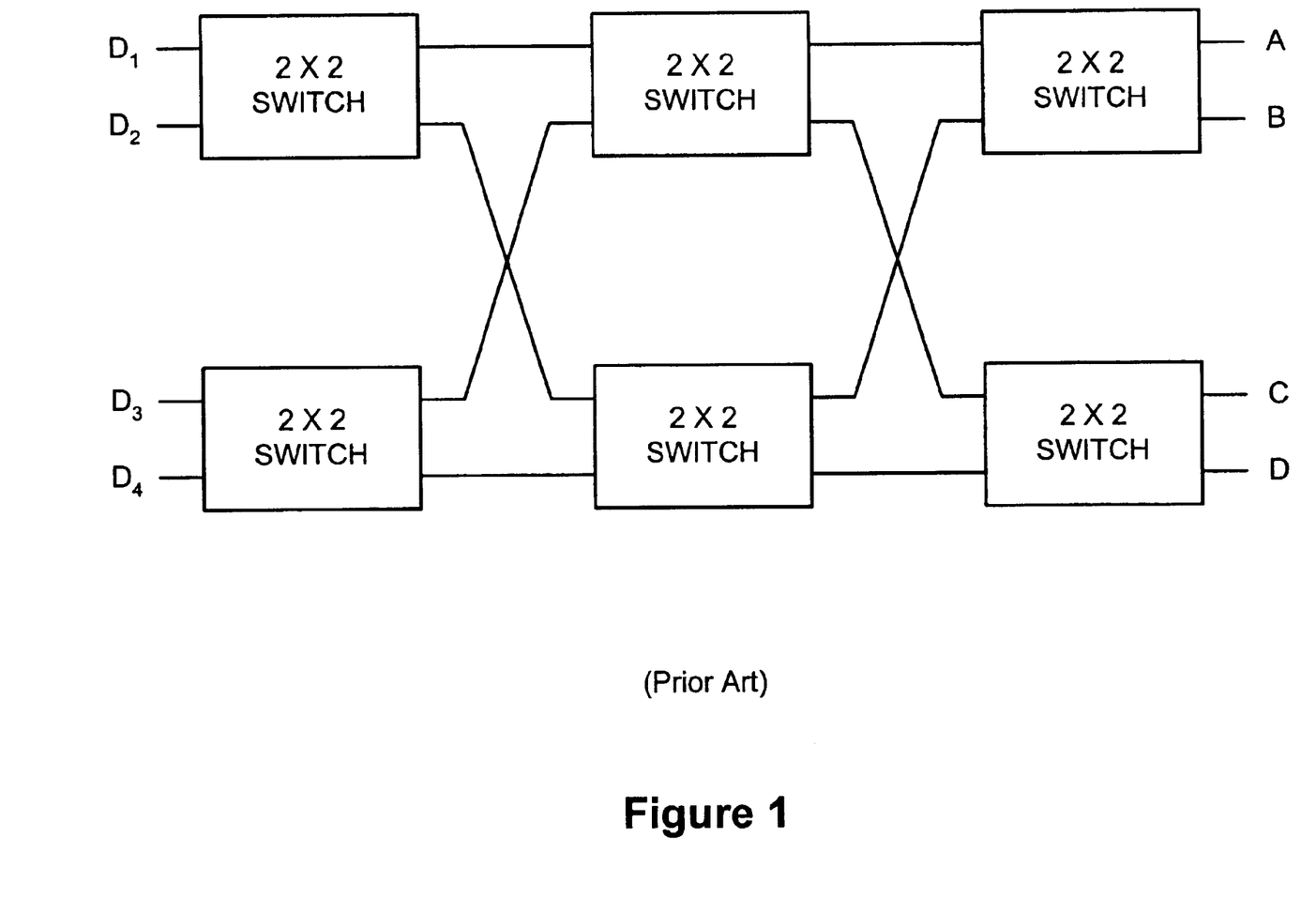
FIG. 1 is a block diagram of a prior art three-stage 4×4 switch constructed from six 2×2 switches.

At present, the most preferable switch fabrics generally require more transistors than are conveniently available on most high-speed semiconductor device technologies. The sheer volume of transistors required to implement large switch fabrics, then, generally prohibits the implementation of a large switch fabric on a single chip. It is typically very difficult, for example, to implement switches larger than 16×16 with current gallium arsenide (GaAs) heterojunction bipolar transistor (HBT) technology. Because of this limitation, large N×N switches are typically created by suitably interconnecting multiple switches of relatively small fabrics. Many techniques for building high-fabric switches from lower-fabric switches can be conceived, such as the exemplary 4×4 switch constructed from six 2×2 switches in a three-stage architecture shown in FIG. 1. With larger switches, this approach minimizes the required number of cross points. Similarly, switches on the order of 512×512, for example, can be constructed from various combinations of 4×4, 8×8, 16×16 or other N×M switches.

As data passes through the various stages of a multi-stage switch, however, various imperfections in the switch generally create noise in the data. Time domain noise in such switches is frequently referred to as "jitter". Stated another way, jitter is the short-term variation of a digital signal's significant instant from an ideal position in time. In the SONET standard, jitter is generally defined as a phase oscillation of at least 10 Hz. The RMS value of random jitter over chains of N switches can typically be shown to increase in proportion to the square root of N, and pattern dependent jitter due to symbol interference tends to increase proportionally with N. If jitter becomes too high, the associated data stream may become unrecoverable without errors. The practical size of switches that can be built from combinations of smaller switches, then, is generally limited by the jitter imposed in each of the various stages.

Several schemes have been devised to eliminate jitter from digital data. One method involves recovering timing data (e.g., a clock signal) from the data itself before and/or after the data passes through the switch. The recovered clock signal is then generally used to re-time the data, typically through a decision circuit such as a flip-flop. Clock recovery circuitry typically includes relatively costly phase-locked loops (PLLs), saw filters, or the like to extract timing information. In addition to being expensive, multiple PLLs are typically difficult to implement on integrated circuits because the voltage-controlled oscillators (VCOs) required by the PLLs tend to phase lock to each other when multiple PLLs are implemented on a single IC. Moreover, PLLs are frequently unable to recover timing data from digital signals that have passed through large switch cascades because the resulting jitter makes the data signal unreadable. PLLs are sometimes implemented between the various stages of the switch to eliminate jitter in intermediate steps, but multiple PLLs compound problems of cost and complexity. Because of cost and other implementation disadvantages, PLL extraction of timing data is an imperfect method of jitter elimination.

Figure 2A:
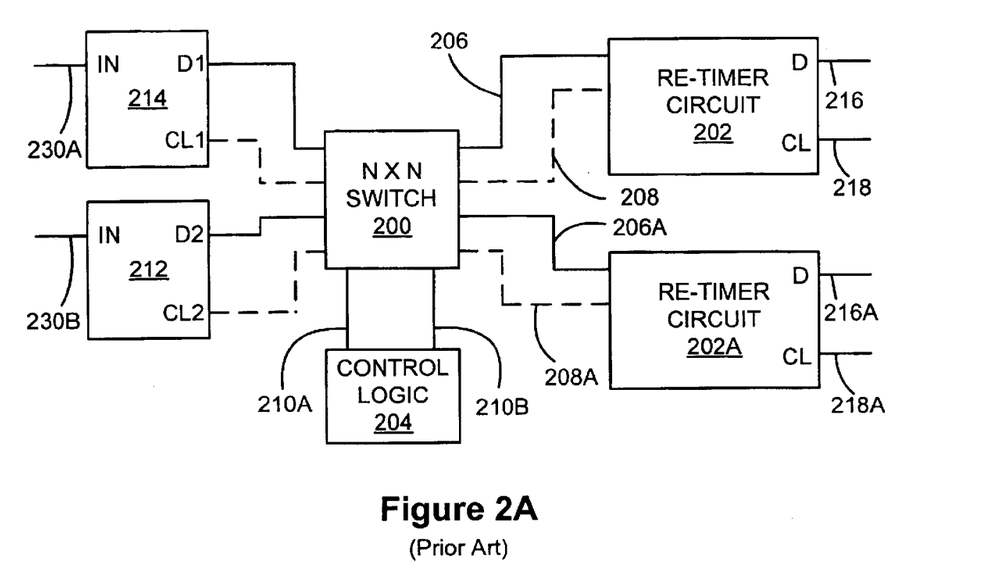
FIG. 2A is a block diagram of a prior art switching technique whereby clock signals are switched with data signals.

Other methods of reducing jitter involve transmitting each data signal in conjunction with a clock signal so that the data can be retimed and recovered to remove accumulated jitter. For example, data signals and associated clock signals may be provided as separate inputs to a N×N switch 200, as shown in FIG. 2A. Data signals and clock signals are routed through switch 200 by control logic 204. Each data signal is then re-timed based upon its own timing information by re-timer 202 which is, for example, a delay locked loop (DLL) circuit.

Figure 2B:
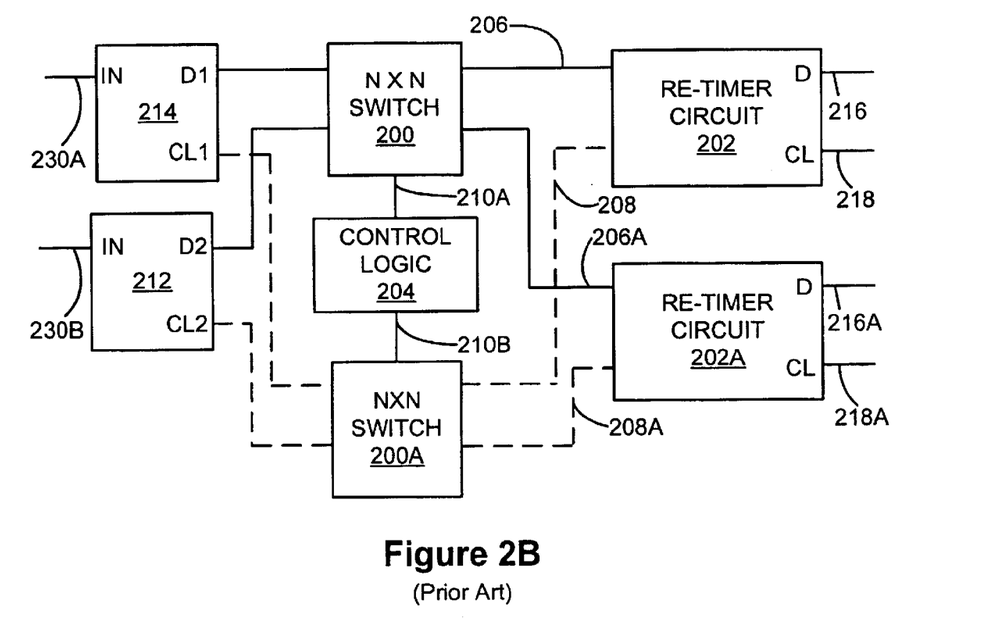
FIG. 2B is a block diagram of a prior art switching technique whereby data and clock signals are separately switched.

Alternatively, clock and data signals may be switched through separate N×N switches as shown, for example, in FIG. 2B. In such a scheme, control logic 204 sequences data signals from multiple sources through N×N switch 200. Corresponding clock signals extracted from the data are switched through a separate N×N switch 200A. The clock re-synchronizes data 202, thereby removing at least some of the accumulated jitter.

Numerous variations of these methods of separately switching clock and data signals could be conceived. Each of these methods, however, generally exhibits certain marked disadvantages. Most notably, the separate switching of clock information requires significant bandwidth. Clock signals in the OC-192 SONET standard, for example, are typically on the order of 10 GHz, so the resources necessary to switch and transmit such high frequency information for every signal are significant. Moreover, the added architecture increases the expense of the switch, as well as the complexity.

SUMMARY OF THE INVENTION

A preferred embodiment of the present invention determines the differences between transmitted clock signals and a particular reference signal. For OC-192 SONET signals, the differences between the clock signals observed and a 10 GHz reference is relatively small (i.e. approximately 20 kHz). Therefore, the low bandwidth difference signals are efficiently transmitted along with the reference signal such that the receiver re-constructs the original clock signal from the difference signal and the reference signal. Because the difference signals generally require little bandwidth compared to the reference signal, many difference signals can be multiplexed together via any multiplexing technique. Thus, many clock signals can be reconstructed from a single reference signal and the multiplexed difference signals. Other embodiments of the invention may employ other multiplexing techniques and signal combination/extraction techniques.

BRIEF DESCRIPTION OF THE DRAWING FIGURES

The above and other objects, features and advantages of the present invention are hereinafter described in the following detailed description of illustrative embodiments to be read in conjunction with the accompanying drawing figures, wherein like reference numerals are used to identify the same or similar parts in the similar views, and.

DETAILED DESCRIPTION OF PREFERRED EXEMPLARY EMBODIMENTS

Although the preferred embodiment of the invention is primarily discussed in terms of transmitting various clock signals in conjunction with data signals in a high-bandwidth switch, any number of other embodiments may fall within the ambit of the present invention. For example, the present invention could be used to transmit data or clock signals in virtually any sort of digital or analog communications system. The methods and devices disclosed herein are suitable for use with any sort of data or transmission medium, including fiber optics, metal conductors, RF waves, coaxial cables and the like.

Figure 3A:
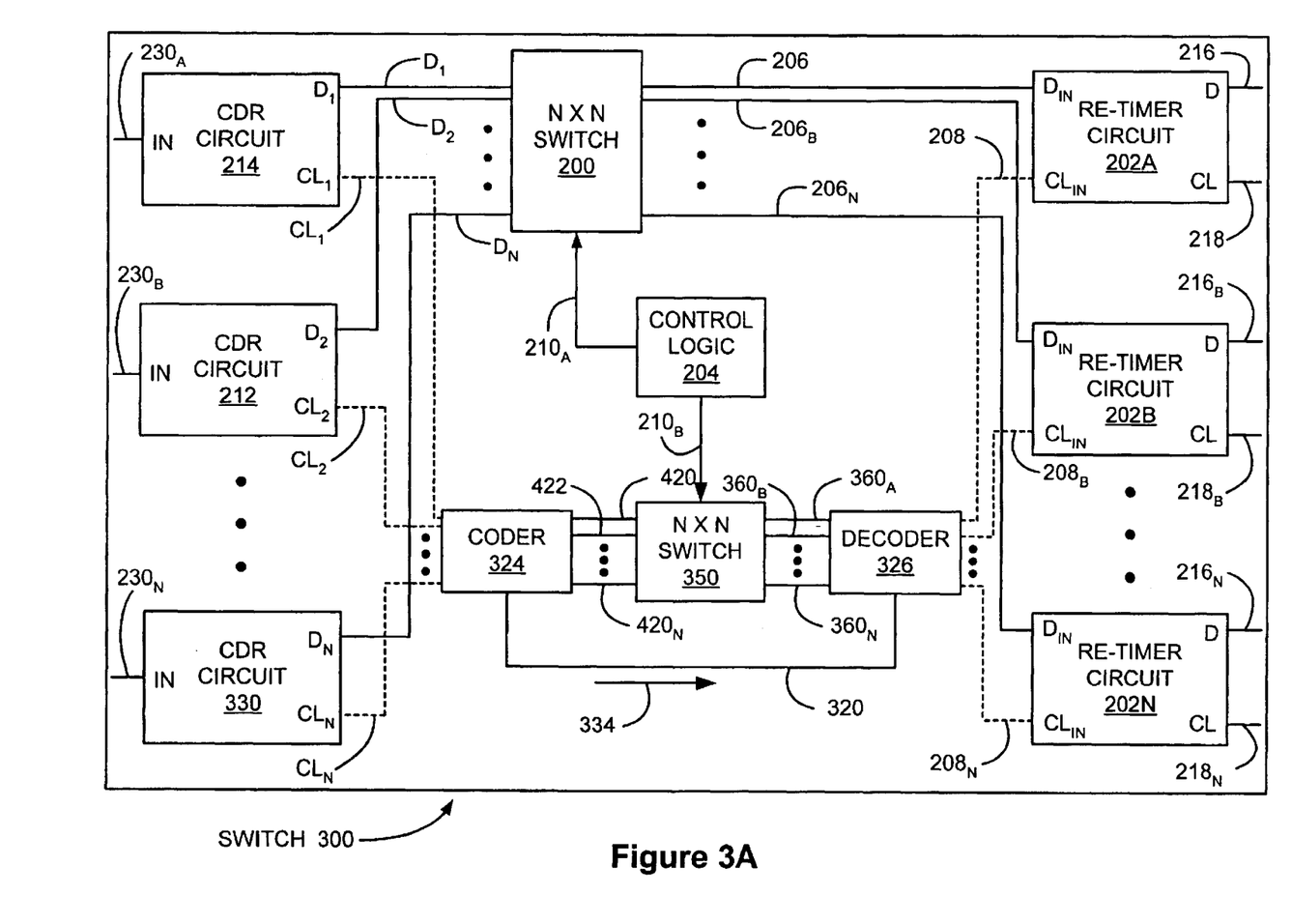
FIG. 3A is a block diagram of an exemplary first embodiment in accordance with the present invention.
Figure 3B:
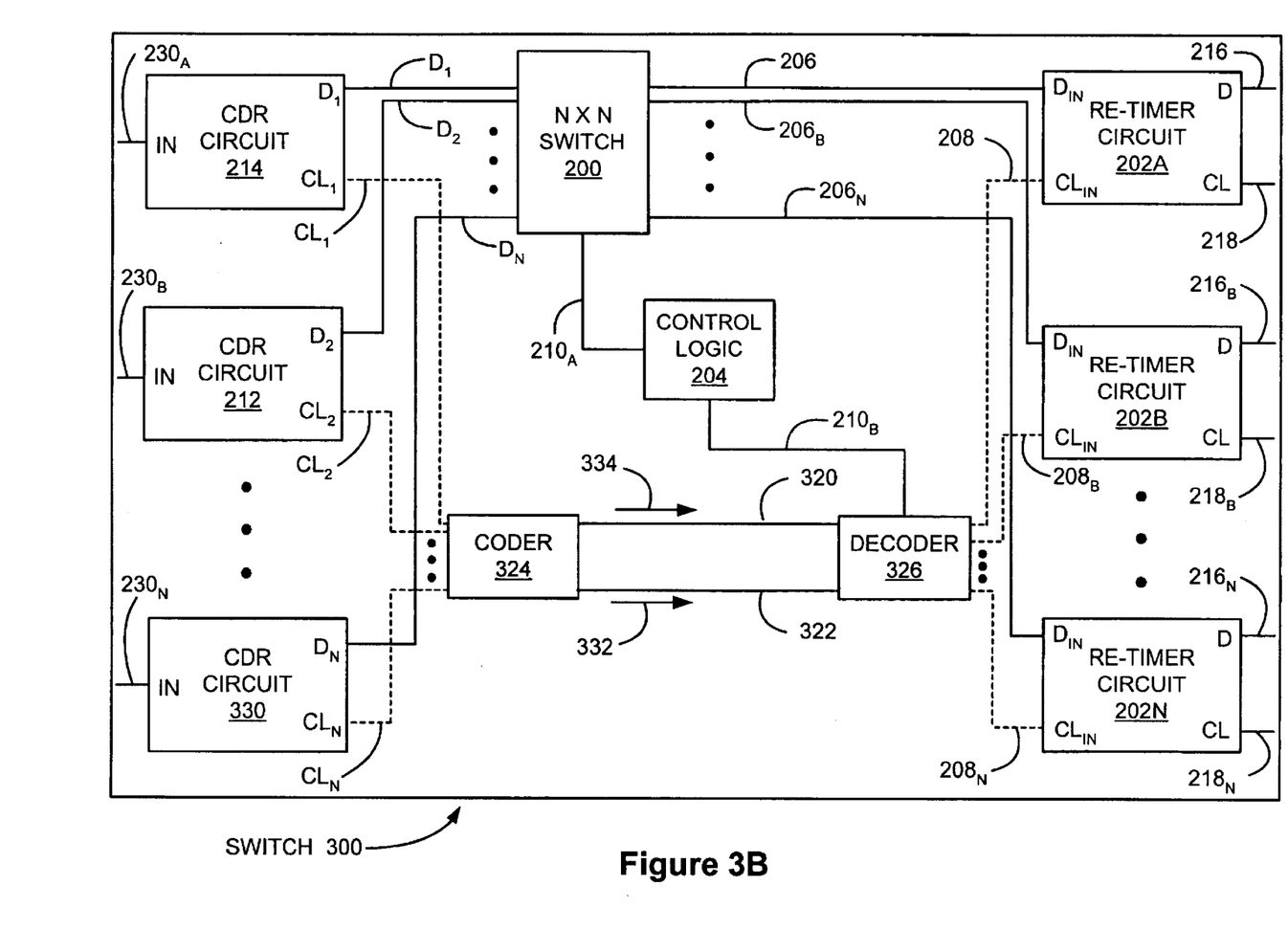
FIG. 3B is a block diagram of an exemplary second embodiment in accordance with the present invention.

With reference to FIGS. 3A and 3B, preferred embodiments of the present invention suitably include a switch 200 that receives data signals D1, D2, . . . ,$D_N$. Although data signals D1, D2, . . . ,$D_N$ are preferably digital signals such as, for example, non-return-to-zero (NRZ) digital data streams, other embodiments of the invention are suitably configured to operate in conjunction with analog or other types of data signals.

Switch 200 is suitably configured to receive input data signals D1, D2, . . . ,$D_N$ from any source. In some embodiments (such as the embodiment shown in FIGS. 3A and 3B), data signals D1, D2, . . . ,$D_N$ are provided by clock data recovery (CDR) circuits 214, 212, and 330, respectively. An example of a CDR circuit is a circuit that uses a phase locked loop or saw filter that suitably extracts the timing data associated with an input data signal as discussed above. Alternatively, CDR circuits 212, 214 and 330 are any suitable components for separating clock signals CL1, CL2, . . . , $CL_N$ (shown as dotted lines in the Figures) from data signals (shown as solid lines in the Figures). In other embodiments, the CDR circuits may be eliminated. In such embodiments, data signals D1, D2, . . . ,$D_N$ are suitably provided directly to switch 200 from external sources.

Switch 200 routes input data signals to various destinations based upon control signals from control logic 204. Switch 200 is any switch that suitably routes data signals to proper destinations. Although FIG. 3 shows switch 200 as a single element, large N×N switches are frequently made up of large combinations of various sub-switches as discussed above. Moreover, those skilled in the art understand that many more inputs can be easily provided to switch 200. For example, N×M switches are capable of receiving N inputs, where N is any integer. Similarly, switch 200 suitably provides multiple outputs (up to M outputs for an N×M switch) as required for the particular application. In some embodiments of the invention, switch 200 is an N×M switch that has different numbers of inputs and outputs, such as a 512×256 switch or a 256×1 switch. Preferably, however, switch 200 is an N×N switch such as, for example, a 512×512 switch or a 256×256 switch.

Timing signals (also called "clock signals") $CL1$, $CL2, \ldots, CL_N$ are suitably provided to a coder 324. Coder 324 preferably receives timing signals extracted by CDR circuits 212, 214 or 230, for example, or from any other source of timing signals. Timing signals $CL1, CL2, \ldots, CL_N$ are preferably streams of alternating digital bits or sinusoidal analog signals. Although not critical to the present invention, maximum efficiency is achieved when the frequencies of the timing signals received at the multiplexer (e.g coder 324) are approximately equal. For example, data signals transmitted in SONET networks at OC-192 bit rates generally have an approximate timing frequency of about 9.953 GHz. Consequently, even though each data signal has a relatively unique associated timing signal, the frequencies of these signals are generally on the same order of magnitude at the same bit rates.

Coder 324, as more fully described below, suitably computes a difference $\Delta f$ between a reference signal 334 and each timing signal. Reference signal (commonly called a "carrier") 334 is preferably an alternating digital signal (e.g., clock signal) or sinusoidal analog signal with a frequency f that approximates the frequency of the data signals (or a multiple of a frequency of the data signals) such that the difference signals $\Delta f$ are minimized. For example, an optimum reference signal 334 for embodiments used in SONET networks is a digital clock signal of approximately 10 GHz.

Differences $\Delta f$ between timing signals $CL1, CL2, \ldots, CL_N$ and reference signal 334 are suitably transmitted to a decoder 326. Reference signal 334 is suitably provided to decoder 326 through medium 320, which is preferably an electrical conductor.

In some embodiments of the invention such as the embodiment shown in FIG. 3A, each difference signal is suitably provided to a switch 350 that selectively routes clock signals to the desired channel in accordance with control signal 210B received from control logic 204. Because the difference signals are relatively low frequency, switch 350 is suitably implemented as a relatively low-speed switch such as a CMOS switch. Switch 350 selectively routes the various difference signals to the proper output channels and suitably provides each difference signal to decoder 326, which is more fully described below.

In other embodiments of the invention such as the embodiment shown in FIG. 3B, difference signals are provided to decoder 326 via a data channel such as channel. Preferably, the various difference signals are switched with any multiplexing or modulating method such as code division multiple access (CDMA) modulation, time division multiplexing, frequency division multiplexing, or the like. In many preferred embodiments, several multiplexing or modulation techniques are suitably combined to provide the proper difference signal $\Delta f$ to data channel 322.

In many preferred embodiments of the invention (including the embodiment shown in FIG. 3B), decoder 326 is suitably controlled by control logic 204. Control logic 204 is preferably a software control that manages the switching of data and clock signals through the switch 200. Control logic 204 provides signals 210A to switch 200 to indicate the desired input signal and the desired output location. Corresponding information 210B is sent to decoder 326 so that the particular timing signal corresponding to the desired data signal can be extracted from the multiplexed signal 322, recombined with the reference signal 320, and provided to an output 208.

After the data signals 206, 206B, $\ldots$, $206_N$ have properly traversed switch 200, data 206, 206B, $\ldots$, $206_N$ is preferably re-timed at retimers 202A, 202B, $\ldots$, $202_N$ based upon associated transmitted clock signal 208, 208B, $\ldots$, $208_N$ received from decoder 326. Although any re-timing circuitry or apparatus would function with the embodiment disclosed, preferred embodiments of retimers 202A, 202B, $\ldots$, $202_N$ use delay locked loops to re-time the data signals. Re-synchronized data signals 216, 216B, $\ldots$, $216_N$ are suitably provided as outputs from retimers 202A, 202B, $\ldots$, $202_N$, and timing signals 208, 208B, $\ldots$, $208_N$ are also preferably provided as outputs 218, 218B, $\ldots$, $218_N$.

In the present exemplary embodiments of FIGS. 3A and 3B, a number of data signals $D1$, $D2$, $\ldots$, $D_N$ are provided to a switch 300 to be routed to one or more destinations. Each data signal $D1$, $D2$, $\ldots$, $D_N$ has an associated timing (i.e., clock) signal $CL1$, $CL2$, $\ldots$, $CL_N$, respectively. All of the timing signals $CL1, CL2, \ldots, CL_N$ preferably (although not necessarily) have frequencies that are relatively similar (i.e., within about 10% of each other). If the frequencies of the timing signals $CL1, CL2, \ldots, CL_N$ are not similar to each other, the frequencies may be up or down converted so that the signals become similar to minimize the required bandwidth. Timing signals $CL1, CL2, \ldots, CL_N$ are suitably provided by external sources, or suitably extracted from the associated data signals by, for example, a PLL-based or other CDR circuit such as circuits 212, 214 and 330. Data signals $D1, D2, \ldots, D_N$ are switched through switch 200 to a desired destination, and clock signals $CL1, CL2, \ldots, CL_N$ are provided to coder 324.

In preferred embodiments, each timing signal $CL1, CL2, \ldots, CL_N$ is compared to a reference signal 334 that is preferably a digital clock signal having approximately the same frequency as timing signals $CL1, CL2, \ldots$, and $CL_N$. Differences between reference signal 334 and the various timing signals $CL1, CL2, \ldots, CL_N$ are suitably transmitted along with reference signal 334 to decoder 326. Because reference signal 334 is preferably chosen to be relatively similar to timing signals $CL1, CL2, \ldots$, and $CL_N$, the computed difference signals are of relatively low frequency. For example, signals complying with the SONET OC-192 standard are clocked at about 9.987 GHz, plus or minus 10 KHz. If SONET timing signals themselves were to be transmitted for a 128×128 switch, for example, 1280 GHz of bandwidth would be required. By transmitting only the differences between the timing signals and the 10 GHz standard, only 1280 KHz (or 0.128 GHz) of bandwidth is required. Hence, the bandwidth required to transmit difference signals is significantly lower than the bandwidth required to transmit all of the unmodified timing signals $CL1, CL2, \ldots, CL_N$.

In some embodiments of the invention, coder 324 is connected to a switch 350 that suitably routes clock difference signals to proper destination channels, preferably in response to control signals 210B from control logic 204 as shown in FIG. 3A.

Alternatively, coder 324 is connected to a decoder 326 through at least one, but preferably two, transmission media 320 and 322 as shown in FIG. 3B. In such latter embodiments, coder 324 suitably mixes timing signals $CL1$, $CL2$ and the like into a combined signal 332 that is provided to decoder 326 via media 322. Many schemes of forming timing signals $CL1, CL2, \ldots, CL_N$ into combined signal 332 can be devised. The various difference signals are preferably combined into signal 332 prior to transmission across data medium 322. Any suitable modulation scheme is within the scope of the present invention, but preferred modulation schemes include CDMA, frequency division multiplexing and time division multiplexing, as well as various combinations thereof. Several modulation schemes for combining the difference signals are discussed below.

After receiving the difference signals, decoder 326 provides the desired timing signals CL1', CL2', ... ,CL$_N$' at outputs 208, 208B, ... ,208$_N$. Thus, each output data signal such as 206 (corresponding to one of D1, D2, ... ,D$_N$) and an associated clock signal 208 (corresponding to one of CL1, CL2, ... ,CL$_N$) are provided at the switch output. In preferred embodiments, each output data signal 206, 206B, ... ,206$_N$ is re-timed with its own associated clock signal 208, 208B, ... ,208$_N$ such that jitter is effectively removed. Re-timing takes place with any suitable re-timing circuitry 202A, 202B, ... ,202$_N$, which are preferably implemented to include DLLs, PLLs, or flip-flops. Data signals 216, 216B, ... , 216$_N$ and associated timing signals 218, 218B, ... , 218$_N$ are preferably provided as outputs to re-timers 202A, 202B, ... ,202$_N$, respectively.

Figure 4A:
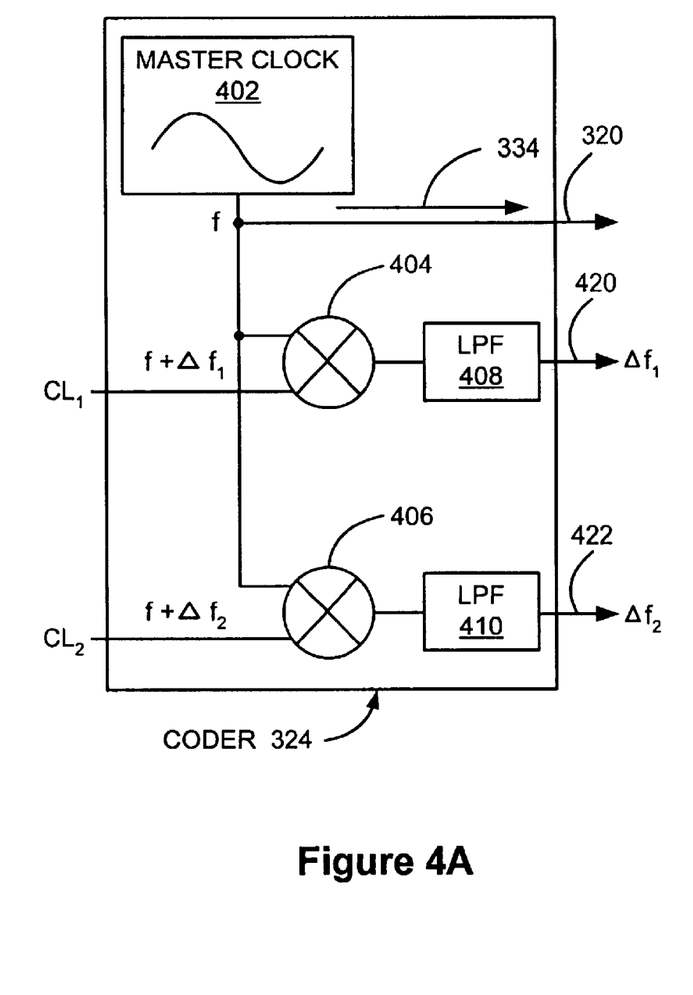
FIG. 4A is a block diagram of an exemplary first embodiment of a coder in accordance with the present invention.
Figure 4B:
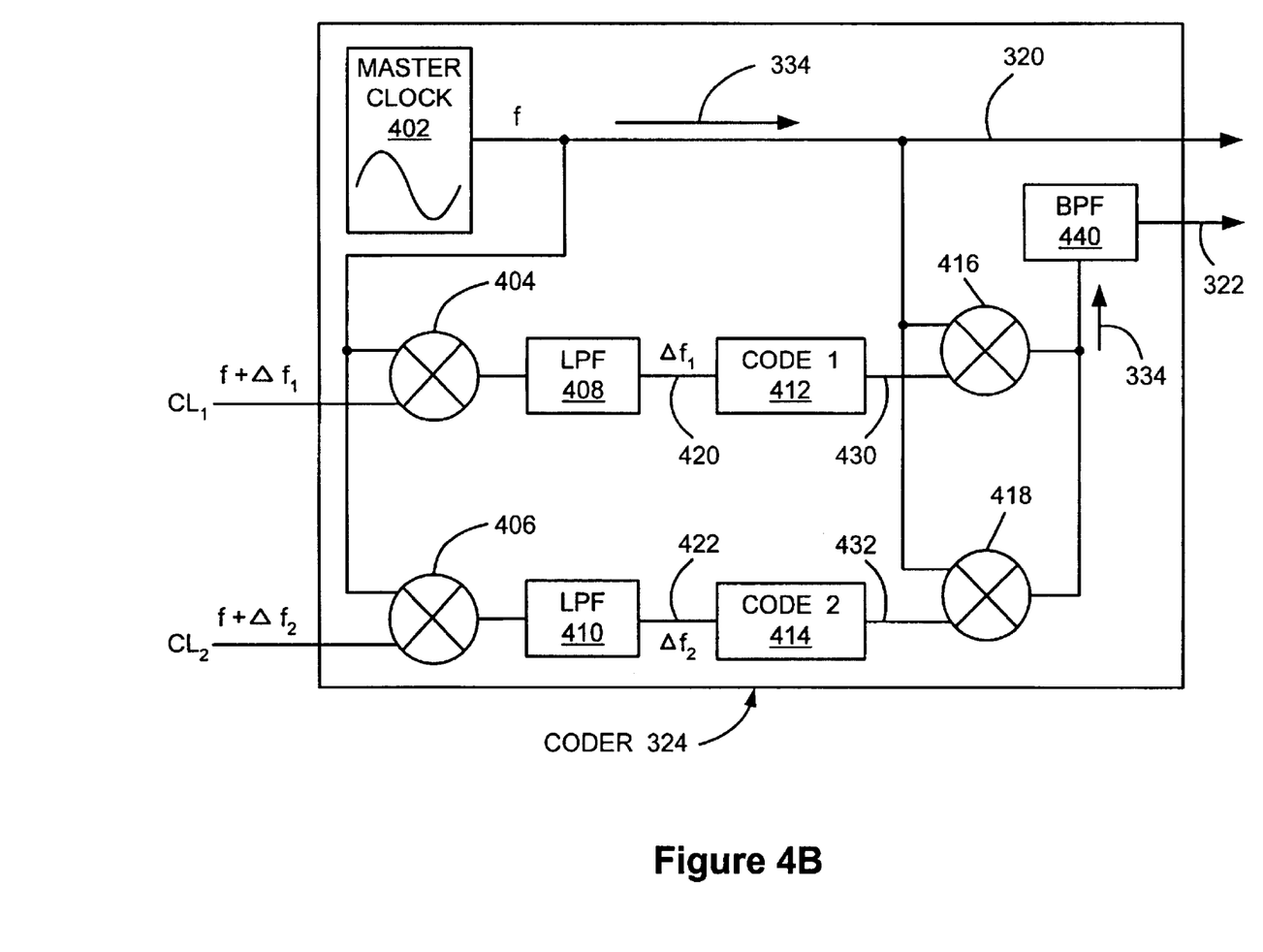
FIG. 4B is a block diagram of an exemplary second embodiment of a coder in accordance with the present invention.

Having thus described the overall structure and operation of exemplary embodiments of the invention, more detail of an exemplary coder 324 is now provided with reference to FIGS. 4A and 4B. A master clock generator 402 suitably generates reference signal 334. While clock generator 402 is shown in FIGS. 4A and 4B to be internal to coder 326, clock generator 402 may be external to coder 326 in other embodiments. Reference signal 334 has a frequency f that preferably corresponds to the approximate frequency of timing signals CL1 and CL2 as discussed above. Timing signals CL1 and CL2 are suitably blended with reference signal 334 at mixers 404 and 406, respectively, such that a difference between each timing signal and reference signal 334 is provided. Mixers 404 and 406 are preferably quadrature mixers. The resultant difference signals are preferably provided to low pass filters 408 and 410, respectively, to remove unwanted harmonics and other out-of-band signals. Such filters are easily constructed using any suitable digital or analog filter. Thus, signal 420 corresponds to the difference $\Delta f_1$ between CL1 and reference signal 320. Similarly, signal 422 corresponds to the difference $\Delta f_2$ between CL2 and reference signal 320.

Figure 5A:
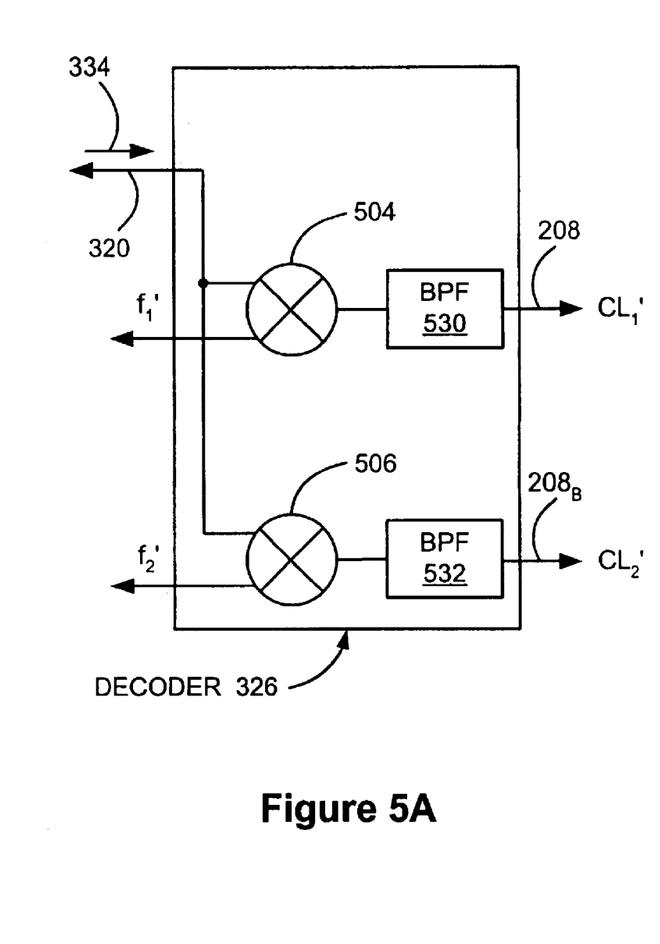
FIG. 5A is a block diagram of an exemplary first embodiment of a decoder in accordance with the present invention.

In some embodiments of the invention such as the embodiment shown in 3A, a coder 324 such as the exemplary coder 324 shown in FIG. 4A suitably provides the difference signals to an N×M switch 350 that switches the difference signals in response to control logic 204. Because the difference signals Δf are relatively low frequency, switch 350 is preferably a standard low-speed switch such as a CMOS switch. The switch then suitably provides the resulting switch outputs to the relevant inputs of decoder 326. A decoder 326 suitable for use with the coder 324 shown in FIG. 4A is shown in FIG. 5A. Such a decoder receives reference signal 334 via medium 320 and combines reference signal 334 with each of the difference signals received from switch 350 at mixers 504 and 506, respectively, to recreate the original clock signals provided to encoder 324. The signals are passed through band pass filter 530 or 532, respectively, to eliminate any unwanted frequency components. The re-combined and filtered signals 208 and 208B are suitably provided to retimer circuits 202A and 202B (best shown in FIG. 3B).

In other embodiments, such as the embodiment shown in FIG. 3B, coder 324, such as the coder shown in FIGS. 4A and 4B, suitably encodes the difference signals 420 and 422 with an orthogonal numeric code substantially in accordance with conventional code division multiple access (CDMA) multiplexing methods. Alternatively or in combination with spread spectrum CDMA modulation, difference signals 420 and 422 are frequency modulated to create signal 332 that is transported to data carrier 322. In a preferred embodiment, reference signal 334 is used as a carrier for the frequency modulated signals. In other embodiments, a separate carrier frequency is generated and used to modulate difference signals 420 and 422. In the preferred embodiment of FIG. 4B, reference signal 334 is suitably combined with the orthogonally-coded signals at mixers 416 and 418, which are preferably quadrature mixers, and the modulated signals 430 and 432 are preferably filtered by band-pass filter 440 and suitably transported to the demultiplexer via signal line 322.

Figure 5B:
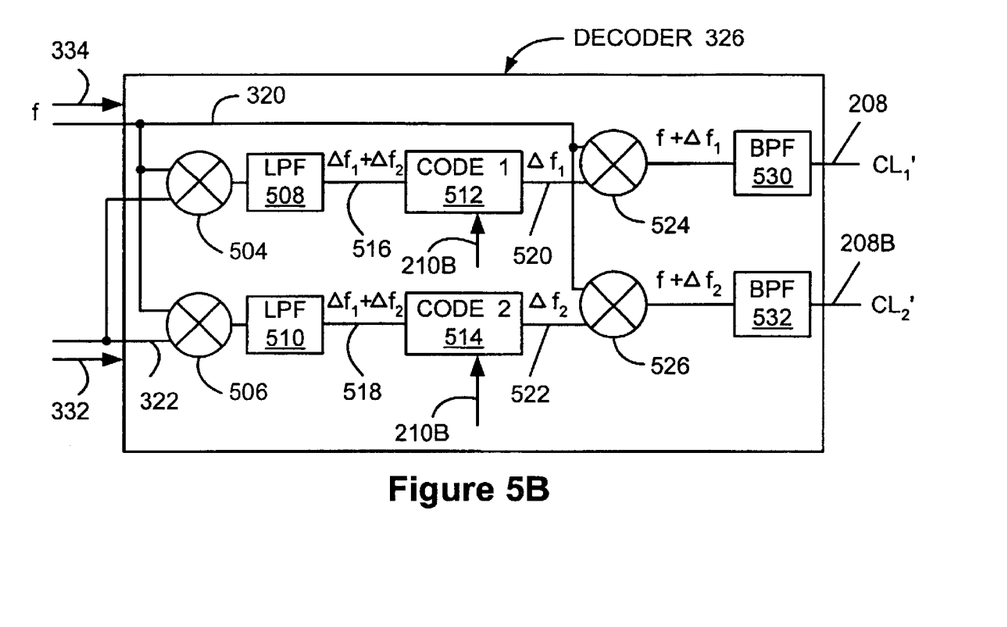
FIG. 5B is a block diagram of an exemplary second embodiment of a decoder in accordance with the present invention.
Figure 5C:
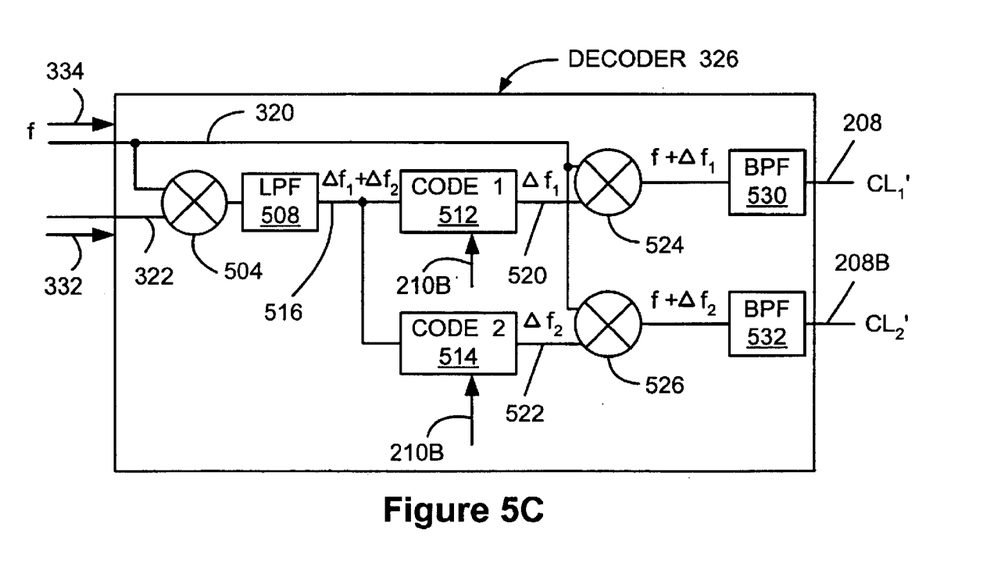
FIG. 5C is a block diagram of an exemplary third embodiment of a decoder in accordance with the present invention.

With reference now to FIG. 5B, a decoder 326 suitable for use with the coder 324 of FIG. 4B receives reference signal 334 and modulated difference signals 332 across media 320 and 322, respectively. Difference signal 332 is combined with reference signal 334 at mixers 504 and 506 to extract the CDMA modulated difference signals 516 and 518. Signals 516 and 518 are preferably passed through low pass filters 508 and 510 to eliminate unwanted harmonics and out of band signals. Alternatively, a single mixer 504 and a single filter 508 are used to provide a common signal 516 to both channels of decoder 326 as shown in FIG. 5C. After passing through filter 508, signal 516 suitably includes the CDMA modulated difference signals for each channel, the signals being separated by a unique orthogonal code. Signal 518 represents an identical signal. Orthogonal demodulating code filters 512 and 514 produce individual difference signals 520 and 522 by applying the proper orthogonal code to signals 516 and 518, respectively, to select out the desired Δf signal. Mixers 524 and 526, which are preferably quadrature mixers, suitably re-combine difference signals 520 and 522, respectively, with reference signal 334 to reproduce original clock signals CL1 and CL2, respectively. Clock signals are preferably switched among the various channels by providing proper orthogonal codes to the proper channel. Each code filter 512 is preferably responsive to control signal 210B provided by control logic 204 so that the proper orthogonal code for the clock signal desired on each channel is applied to that particular channel.

Each of the elements of coder 324 and decoder 326 are preferably implemented in an integrated circuit using conventional circuit technology. For example, the coder 324 and decoder 326 are preferably implemented using HBT IC technology available from Rockwell Semiconductor Systems of Newberry Park, Calif. Alternatively, multiplexer 324 and demultiplexer 326 are implemented with digital computers, digital signal processors, or any other suitable technique or component.

To reduce complexity and ease understanding, FIGS. 4A, 4B, 5A, 5B and 5C show components with only two data channels. For example, FIG. 4A shows an exemplary multiplexer 324 with only two inputs. As noted previously, many more channels could be easily added to multiplexer 324 by simply increasing the number of mixers, filters and orthogonal code multipliers. For example, a multiplexer 324 supporting an N×N switch would suitably require N separate input channels, each channel requiring its own mixers, filter, and optional orthogonal code.

Referring again to FIGS. 4B and 5B, multiple clock signals such as CL1 and CL2 are provided to coder 324, which suitably computes the difference Δf between each timing signal and reference signal 334. A preferred method of computing difference signal 420 involves mixing timing signal CL1 with reference signal 320 at mixer 404 and passing the difference signal through low pass filter 408 to remove any extraneous signals or noise. Difference signal 420 (shown as $\Delta f_1$ in the drawing) is suitably encoded by CDMA encoder 412 with an orthogonal code and frequency modulated, preferably using reference signal 334 as a carrier frequency, prior to transmission to decoder 326 via medium 322. Similarly, timing signal CL2 is blended with reference signal 334 at mixer 406 before filtering at filter 410 to compute the difference between CL2 and reference signal 334. This difference signal 422 (shown as $\Delta f_2$ in the drawing) is orthogonally encoded at CDMA coder 414 and frequency modulated at mixer 418 using reference signal 334 as a carrier. Although signals 430 and 432 share the same bandwidth, they are separated by a different orthogonal code.

Decoder 326 suitably receives the combined encoded and multiplexed difference signal 332 and reference signal 334 via transmission media 322 and 320, respectively. Decoder 326 then demodulates the signal using, for example, mixer 504 and low pass filter 508 as appropriate. The desired difference signal 520 and 522 is then obtained by applying the proper orthogonal code at CDMA decoders 512 and 514. The proper orthogonal code is suitably provided by control signals 210B in response to control logic 204. Each proper difference signal 520 is then mixed with reference signal 320 at mixer 524 to re-create signal CL1. Similarly, difference signal 522 is mixed with reference signal 334 at mixer 526 to re-create signal CL2. Output signals are preferably passed through bandpass filters 530 and 532 to remove any undesired frequency components.

Figure 6:
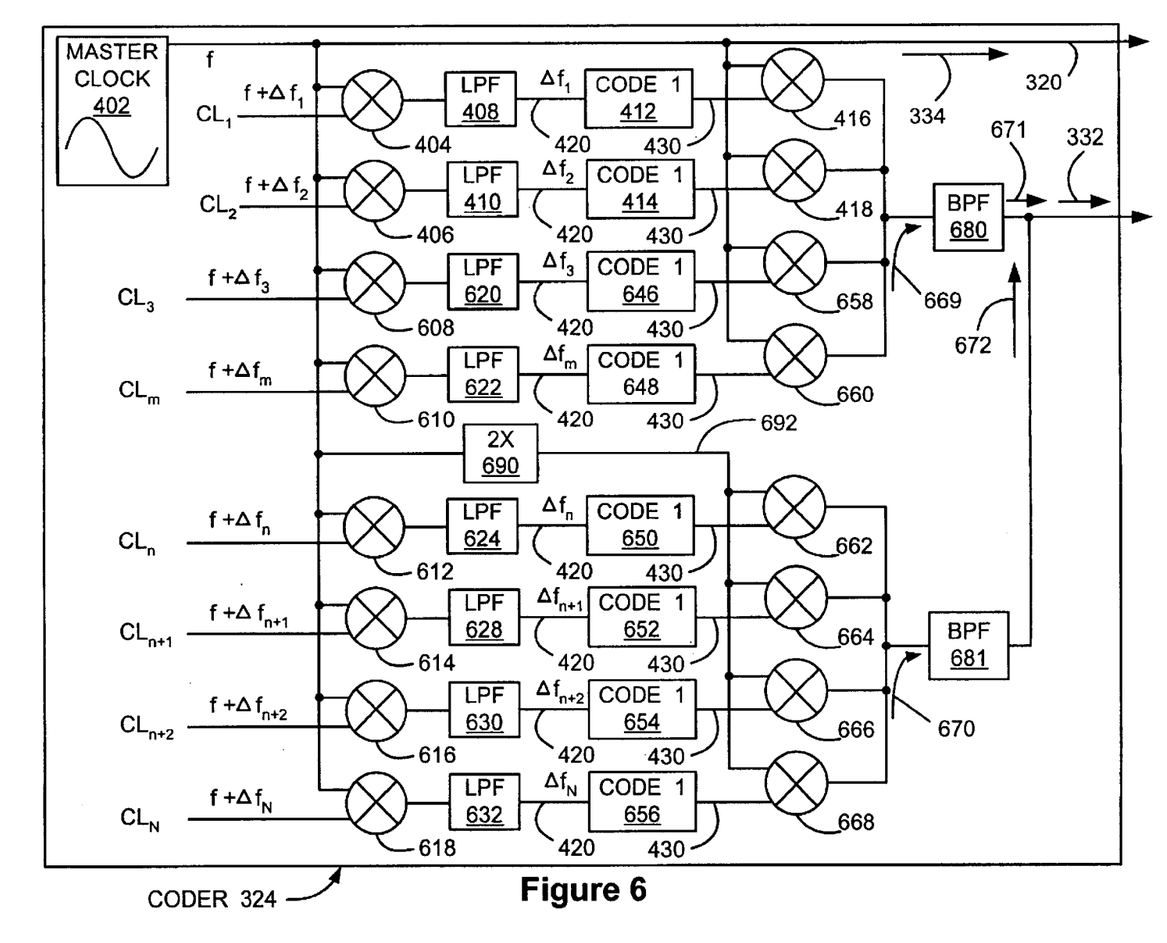
FIG. 6 is a block diagram of a third exemplary coder in accordance with the present invention.

A more elaborate exemplary coder 324 that includes CDMA and frequency multiplexing is shown in FIG. 6. As discussed above, a master clock generator 402 provides a master clock signal 320 that is combined with each timing signal CL1, CL2, . . . ,CLN at mixers 404, 406, 608, 610, 612, 614, 616 and 618 to produce difference signals 420, 422, 634, 636, 638, 640, 642 and 644, respectively. Each mixer is preferably a quadrature mixer. The resultant difference signals are then preferably filtered by low pass filters 408, 410, 620, 622, 624, 628, 630 and 632, respectively, to remove any unwanted harmonics or out-of-band signals. Each difference signal is then preferably assigned a unique orthogonal code. Alternatively, orthogonal codes can be reused across different sets of inputs as shown in FIG. 6, in which each set is modulated such that each difference signal is suitably reconstructed at decoder 326. For example, FIG. 6 shows a scheme in which selected difference signals 638, 640, 642 and 644 are orthogonally encoded and then frequency modulated with a carrier 672 having a frequency equal to two times the frequency f of reference signal 334. The higher frequency signal 672 is readily formulated by passing reference signal 334 through multiplier 670. Any number of carrier frequencies can be generated through similar means. Although carrier frequencies of any frequencies could be used, preferred embodiments use integer multiples of reference signal 334. The encoded signals for each modulation set are suitably combined to form signals 669 and 670, which are preferably passed through band pass filters 680 and 681, repectively, to remove unwanted harmonics and other frequency components. After the various difference signals are suitably modulated, the filtered signals 671 an 672 anre suitably combined to form modulated signal 332, which is provided to decoder 326 through data medium 322.

Figure 7:
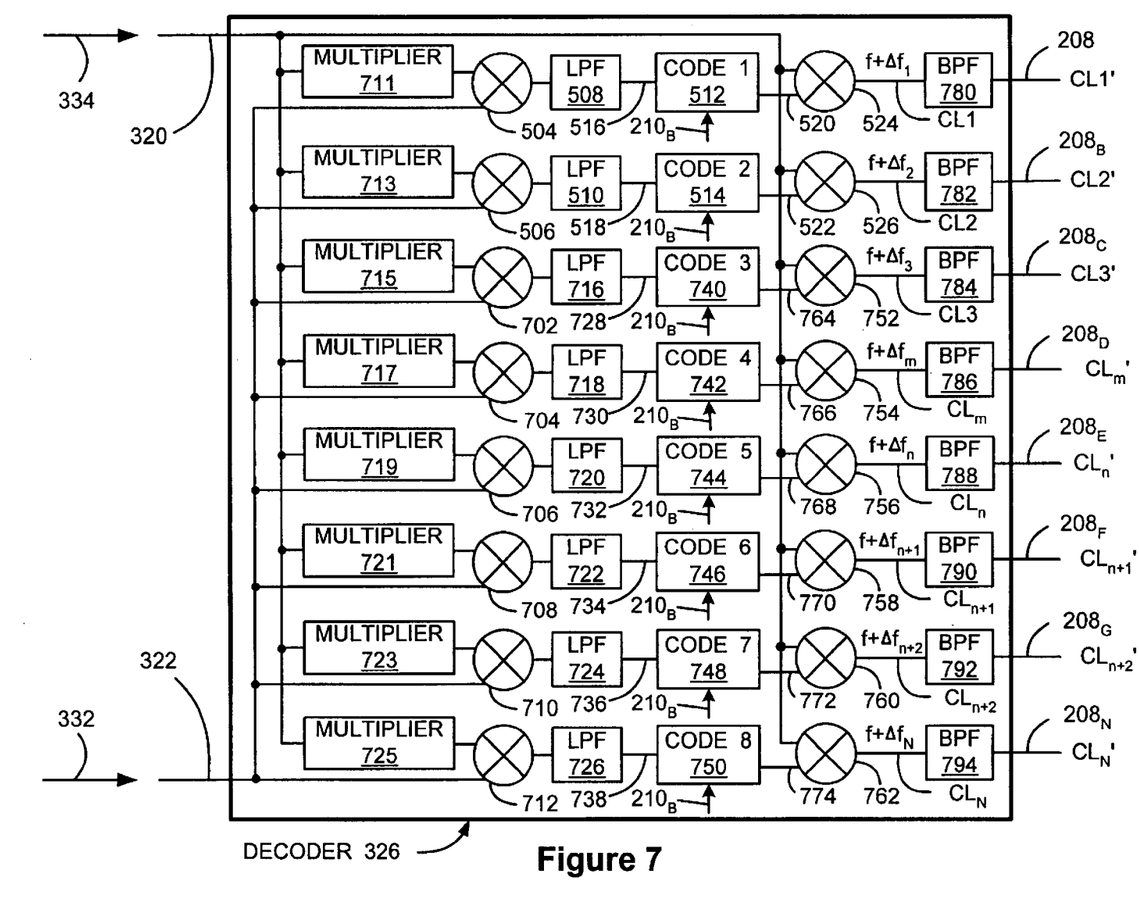
FIG. 7 is a block diagram of a fourth exemplary decoder in accordance with the present invention.

With reference now to FIG. 7, decoder 326 suitably receives the modulated difference signals via data medium 322 and provides modulated difference signal 332 to the various mixers 504, 506, 702, 704, 706, 708, 710 and 712.

Additional channels could also be provided by adding additional mixers, as discussed above. Each mixer also receives the carrier signal such as reference signal 320 through a programmable multiplier 711, 713, 715, 717, 719, 721, 723 or 725, as appropriate. Each multiplier is responsive to control signals 210B such that the proper demodulation frequency for the selected channel is selected. The multipliers compute the proper carrier frequency, which is preferably an integer multiple of the frequency f of reference signal 334, and each proper frequency is provided to the respective mixer. After the modulated difference signal 334 is combined with the carrier signal, the combined signal is provided to low pass filters such as filters 508, 510, 716, 718, 720, 722, 724 and 726 to remove unwanted frequency components. The resultant signals 516, 518, 728, 730, 732, 734, 736 and 738 each contain the sum of the coded difference signals modulated with a signal at a particular frequency.

Individual difference signals are recovered from signals 516 et al. and 732 et al. by CDMA decoder elements 512, 514, 740, 742, 744, 746, 748 and 750. The decoder elements suitably apply orthogonal codes to the combined signals to extract the proper difference signal desired, in accordance with control signals 210B from control logic 204 (best shown in FIG. 3B). Difference signals 520, 522, 764, 766, 768, 770, 772 and 774 are then suitably combined with the reference signal 320 at mixers 524, 526, 752, 754, 756, 758, 760 and 762, respectively, to recreate the timing signals CL1, CL2, . . . , $CL_N$ provided to coder 324. The output timing signals are then provided as timing outputs 208, 208B, 208C, . . . ,$208_N$. Each output signal is preferably passed through bandpass filter 780, 782, 784, 786, 788, 790, or 792, as appropriate, to remove any unwanted frequency components.

In summary, a signal switch system is disclosed that avoids problems with jitter that were encountered in prior art systems. In preferred embodiments, timing information is extracted from data prior to entry into the switch. Whereas data is switched normally, associated timing signals are suitably modulated and/or multiplexed for efficient transmission. Timing information is recombined with the data at the switch output. To preserve bandwidth, only differences between the timing signal and a reference signal are preferably transmitted. Multiple differences are suitably multiplexed or modulated prior to transmission and de-multiplexed/demodulated after receipt to facilitate transfer across a minimal number of transmission media.

The corresponding structures, materials, acts and equivalents of all elements in the claims below are intended to include any structure, material or acts for performing the functions in combination with other claimed elements as specifically claimed. The scope of the invention should be determined by the appended claims and their legal equivalents, rather than by the examples given above.

The claimed invention is:

1. A method of relaying a plurality of timing signals across a first medium and through a switch fabric that communicably connects a transmitter to a receiver, the method comprising the steps of:

constructing a plurality of timing difference signals at the transmitter, each timing difference signal corresponding to a difference between one of the plurality of timing signals and a common reference timing signal;

sequencing each of the plurality of timing difference signals onto the first medium;

providing the common reference timing signal from the transmitter to the receiver via a second medium; and re-combining each of the plurality of timing difference signals with the common reference timing signal at the receiver to reconstruct the plurality of timing signals.

2. The method of claim 1 wherein the step of sequencing each of the plurality of timing difference signals onto the first medium comprises the step of coding each of the plurality of timing difference signals with an orthogonal code to form a plurality of orthogonal signals.

3. The method of claim 1 wherein the step of sequencing each of the plurality of timing difference signals onto the first medium comprises time division multiplexing.

4. The method of claim 1 wherein the step of sequencing each of the plurality of timing difference signals onto the first medium comprises wavelength division multiplexing.

5. The method of claim 2 wherein the plurality of orthogonal signals is arranged into a first orthogonal group.

6. The method of claim 5 wherein the first orthogonal group is sequenced on the first medium with at least one other orthogonal group with time division multiplexing.

7. The method of claim 5 wherein the first orthogonal group is sequenced on the first medium with at least one other orthogonal group with wavelength division multiplexing.

8. The method of claim 1 wherein the step of sequencing each of the plurality of difference signals onto the first medium comprises frequency division multiplexing.

9. The method of claim 1 wherein the constructing step uses a plurality of first quadrature mixers to construct the plurality of difference signals from the plurality of timing signals and the common reference timing signal, and wherein the re-combining step uses a corresponding plurality of second quadrature mixers to re-combine the plurality of timing difference signals with the common reference timing signal in order to reconstruct the plurality of timing signals.

10. The method of claim 5 wherein the first orthogonal group is sequenced on the first medium with at least one other orthogonal group with frequency division multiplexing.

11. The method of claim 5 further comprising upconverting or downconverting the plurality of timing signals before the constructing step in order to make the plurality of timing signals substantially similar in frequency to a carrier signal.

12. A timing circuit adapted for providing a plurality of timing signals across a transmission medium and through a switch fabric, the timing circuit comprising:

a coder configured to receive the plurality of timing signals from the switch fabric, construct a plurality of timing difference signals from the plurality of timing signals, and adapted to sequence the plurality of timing difference signals over the transmission medium, with a particular timing difference signal corresponding to a difference between a particular timing signal and a common reference timing signal; and a decoder adapted to receive the plurality of timing difference signals from the transmission medium and configured to re-combine the plurality of timing difference signals with the common reference timing signal in order to reconstruct the plurality of timing signals.

13. The timing circuit of claim 12 wherein the sequencing of the plurality of timing difference signals onto the transmission medium comprises the coder coding each of the plurality of timing difference signals with an orthogonal code to form a plurality of orthogonal signals.

14. The timing circuit of claim 12 wherein the coder is further configured to upconvert or downconvert the plurality of timing signals before constructing the plurality of timing difference signals in order to make the plurality of timing signals substantially similar in frequency to a carrier signal.

15. The timing circuit of claim 12 wherein the coder uses a plurality of first quadrature mixers to construct the plurality of difference signals and the decoder uses a corresponding plurality of second quadrature mixers to reconstruct the plurality of timing signals.

* * * * *